(12) United States Patent
Wardman et al.

(10) Patent No.: US 10,320,775 B2
(45) Date of Patent: Jun. 11, 2019

(54) ELIMINATING ABUSE CAUSED BY PASSWORD REUSE IN DIFFERENT SYSTEMS

(71) Applicant: PAYPAL, INC., San Jose, CA (US)

(72) Inventors: Bradley Wardman, Phoenix, AZ (US); Nathan Robert Pratt, Scottsdale, AZ (US)

(73) Assignee: PAYPAL, INC., San Jose, CA (US)

( * ) Notice: Subject to any disclaimer, the term of this patent is extended or adjusted under 35 U.S.C. 154(b) by 141 days.

(21) Appl. No.: 15/260,388

(22) Filed: Sep. 9, 2016

(65) Prior Publication Data
US 2018/0077135 A1    Mar. 15, 2018

(51) Int. Cl.
H04L 29/06    (2006.01)

(52) U.S. Cl.
CPC ........ *H04L 63/083* (2013.01); *H04L 63/0421* (2013.01); *H04L 63/0853* (2013.01)

(58) Field of Classification Search
CPC ............... H04L 63/083; H04L 63/0421; H04L 63/0853
See application file for complete search history.

(56) References Cited

U.S. PATENT DOCUMENTS

| | | | |
|---|---|---|---|
| 7,165,182 B2 | 1/2007 | Excoffier et al. |
| 8,640,231 B2 | 1/2014 | Florencio et al. |
| 9,300,629 B1 | 3/2016 | Jahr |
| 2005/0114673 A1 | 5/2005 | Raikar et al. |

OTHER PUBLICATIONS http://www.infoworld.com/article/2623504/data-security/study-finds-high-rate-of-password-reuse-among-users.html, Feb. 10, 2011, 4 pages.
http://www.infoworld.com/article/2623343/data-security/password-reuse-opens-doors-for-cyber-criminals.html, Feb. 15, 2011, 4 pages.
http://smallbiztrends.com/2013/02/microsoft-hack.html, Feb. 25, 2013, 4 pages.
http://www.eweek.com/security/google-chrome-extension-warns-against-password-reuse.html, Apr. 29, 2015, 6 pages.
http://www.nytimes.com/2016/01/21/technology/personaltech/apps-to-manage-passwords-so-they-are-harder-to-crack-than-password.html?r=0, Jan. 21, 2016, 5 pages.
https://www.dashlane.com/passwordmanager, May 7, 2016, 6 pages.

*Primary Examiner* — Oleg Korsak
(74) *Attorney, Agent, or Firm* — Haynes and Boone, LLP (57) ABSTRACT

Methods, systems, and computer program products for eliminating abuse caused by password reuse in different computer systems are disclosed. For example, a computer-implemented method may include receiving a security request comprising an anonymized version of authentication data from a first computer system of a first organization, analyzing the security request to determine a second computer system of a second organization to contact for detecting reuse of the authentication data, generating a second security request comprising the anonymized authentication data for the second computer system, sending the second security request to the second computer system of the second organization, analyzing a response to the second security request from the second computer system to determine whether the anonymized authentication data associated was detected, and providing a response to the first security request indicating whether the second computer system detected reuse of the authentication data.

20 Claims, 4 Drawing Sheets

ELIMINATING ABUSE CAUSED BY PASSWORD REUSE IN DIFFERENT SYSTEMS

TECHNICAL FIELD

The present disclosure generally relates to computer systems and, more particularly, to the security of computer systems and Internet services.

BACKGROUND

Cybercrime generally refers to criminal activity involving computer systems. Such criminal activity includes the use of computer systems to perpetrate crimes and illegally access private electronic data. Cybercriminals may gain access to private user account information in a number of ways. For example, cybercriminals may obtain user account credentials and information by exploiting weaknesses in centralized computer systems, by infiltrating local computer systems of users, by deceiving users into providing account information, by stealing user account information directly from a source, by intercepting user account information from a user or network, and by reusing captured user account information to unlawfully access other systems.

Password reuse generally describes when a user sets the same password or credentials on two or more different computer systems or websites. For example, a user may use the same username and password to access their work account, social media account, and online financial accounts. While users may view such reuse as a convenience, cybercriminals prey on such behavior causing major losses each year. For example, cybercriminals may acquire user credentials via phishing, malware, exploiting security vulnerabilities, or another party. Cybercriminals then may test the stolen credentials on other websites to identify the best candidates to sell or to begin monetizing other accounts associated with the stolen credentials.

Information privacy generally refers to the protection of sensitive user data. For example, law, industry standards, and self-regulation may define data privacy rules and regulations. However, such practices generally limit the sharing of user account information, even in a security-related context that would protect both users and other organizations.

Therefore, providing new and improved ways of detecting and responding to password reuse across different systems, and educating users about existing or imminent password reuse while maintaining the highest data privacy standards are of importance.

BRIEF DESCRIPTION OF THE DRAWINGS

Various examples of the present disclosure will be understood more fully from the detailed description given below and from the accompanying drawings of various examples of the disclosure. In the drawings, like reference numbers may indicate identical or functionally similar elements. The drawing in which an element first appears is generally indicated by the left-most digit in the corresponding reference number.

DETAILED DESCRIPTION

Systems, methods, and computer program products for detecting and preventing abuse caused by password reuse in different, unrelated computer systems are disclosed. Cybercriminals may steal authentication credentials from a computer system of an organization. The cybercriminals then may use the stolen credentials to access and exploit one or more different computer systems of other organizations. This behavior occurs because many users reuse the exact same authentication credentials for different accounts. As such, many service providers incur increased risk, liability, and losses due to behavior outside of their control.

Today, organizations generally do not share information about compromised or uncompromised accounts. For example, data privacy laws and regulations restrict the sharing of user information outside of an organization. Further, the Internet lacks a centralized security provider and framework to integrate security information and practices across many thousands of online service provider organizations.

In examples of the present disclosure, a cross-enterprise computer security exchange provides services that allow various organizations to share anonymized user account information and anonymized user authentication data with a centralized, trusted third party for additional security and risk mitigation. Such data may be provided, compared, correlated, matched, and reported in an anonymized form to maintain data privacy and to remain in compliance with various privacy laws and regulations.

In an example, a requesting organization initiates a request to detect reuse of authentication data in other computer systems based on activity involving user authentication data. For example, a user may create new authentication data, update existing authentication data, present authentication data to access a computer system, access computer system features based on one or more sets of authentication data, etc. An organization also may initiate a request to detect authentication data reuse randomly, periodically, based on a security event, or for any other reason. The organization then anonymizes authentication data associated with a user account and sends the anonymized authentication data to a cross-enterprise computer security exchange for comparison against other anonymized user account information from one or more other participating organizations.

In an example, the cross-enterprise computer security exchange receives anonymized authentication data from an organization. The cross-enterprise computer security exchange then determines which computer systems to contact to determine whether the authentication data has been reused. The cross-enterprise computer security exchange then generates a secondary request for each of one or more other computer systems. For example, secondary requests may comprise anonymized authentication data for comparison with anonymized data associated of one or more other computer systems. The cross-enterprise computer security exchange then sends the secondary requests to respective computer systems for processing.

In an example, the cross-enterprise computer security exchange receives responses from each one of a plurality of different computer systems indicating whether anonymized authentication data provided in a secondary request was detected. The cross-enterprise computer security exchange then analyzes the responses to generate a summary response for the original request indicating whether the anonymized authentication data was reused in another computer system.

In an example, the requesting organization receives and analyzes the summary response from the cross-enterprise computer security exchange. The requesting organization then may take appropriate action when the summary response indicates the anonymized authentication data was reused in another system. For example, the requesting organization may immediately educate or warn a user during an active session, passively educate or warn a user in a message outside of an active session, force the user to create unique authentication data that is not duplicated or reused on another system, temporarily lock or disable a user account, apply limits or restrictions to a user account until authentication data is updated, etc.

Accordingly, aspects of the present disclosure allow organizations to share anonymized user account information and authentication data for security-related purposes in a protected way that preserves data privacy and maintains compliance with data privacy laws and regulations.

Figure 1:
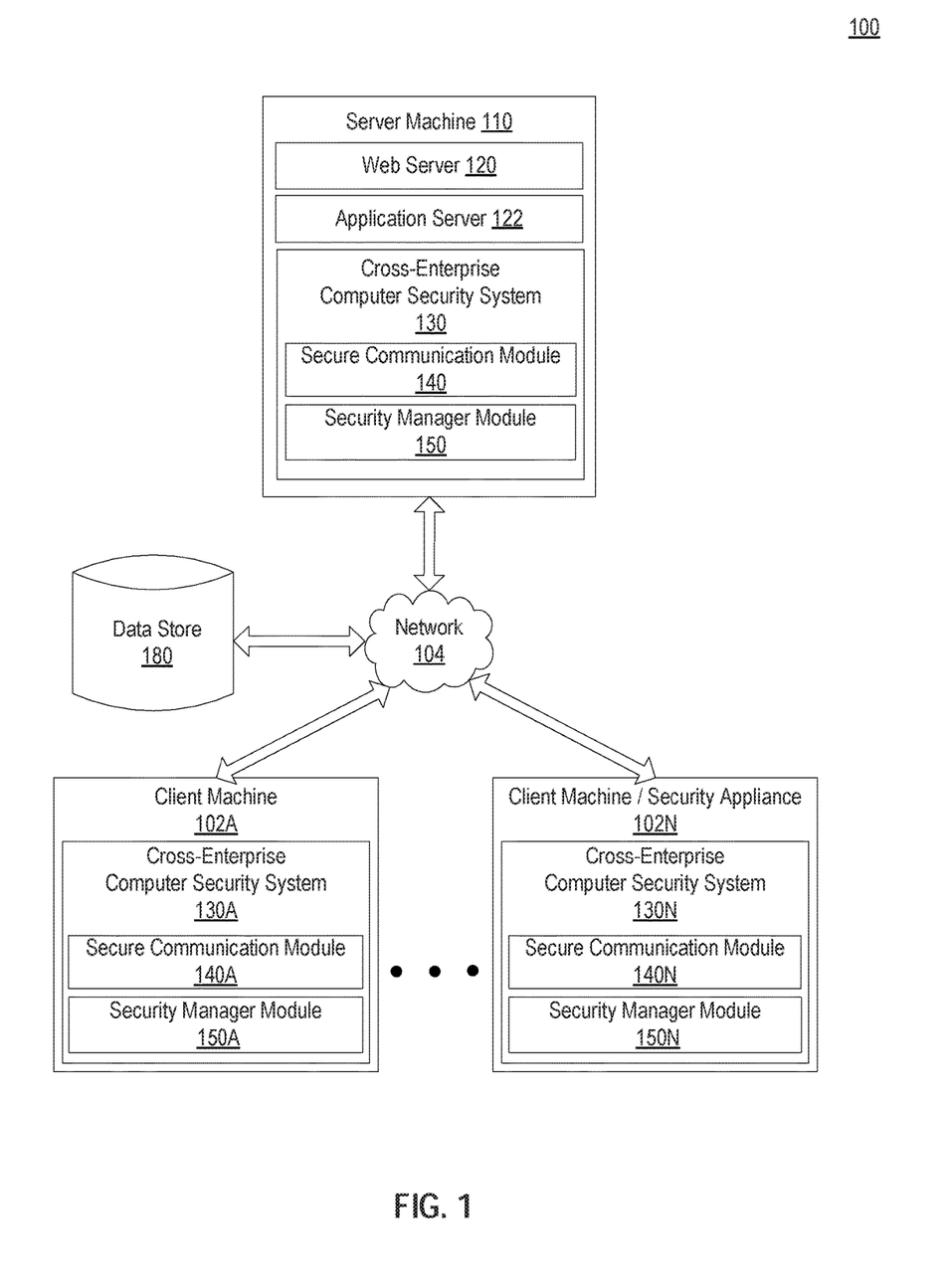
FIG. 1 is a block diagram illustrating a system architecture, in accordance with various examples of the present disclosure.

FIG. 1 illustrates an exemplary system architecture 100 in which examples of the present disclosure may be implemented. System architecture 100 includes one or more server machine(s) 110, one or more data store(s) 180, one or more client device(s) 102A, and one or more server machine(s) or specialized security appliance(s) 102N connected via one or more network(s) 104.

Network 104 may be a public network (e.g., the Internet), a private network (e.g., local area network (LAN) or wide area network (WAN)), or any combination thereof. In an example, network 104 may include the Internet, one or more intranets, wired networks, wireless networks, and/or other appropriate types of communication networks. Network 104 also may comprise a wireless telecommunications network (e.g., cellular phone network) adapted to communicate with other communication networks, such as the Internet. In addition, network 104 may include one or more short-range wireless networks or beacon networks.

Data store 180 generally refers to persistent storage capable of storing various types of data, such as text, audio, video, and image content. In some examples, data store 180 may include a network-attached file server, while in other examples data store 180 may include other forms of persistent storage such as an object-oriented database, a relational database, and so forth.

Client device 102A generally may be a personal computer (PC), laptop, mobile phone, tablet computer, server computer, wearable computing device, or any other type of computing device (i.e., a client machine). Client device 102A may run an operating system (OS) that manages hardware and software of the client device 102A. A browser (not shown) may run on client device 102A (e.g., on the OS of client device 102A). The browser may be a web browser that can access content and services provided by web server 120, application server 122, or a combination of web server 120 and application server 122. Other types of computer programs and computer scripts also may run on client device 102A.

Server machine or security appliance 102N generally refers to a specialized or dedicated security device (i.e., client or server machine) used to provide security services to protect an computer systems and data. In an example, server machine or security appliance 102N may include one or more of a server computer, router, a switch, a firewall, a dedicated computing device, a shared computing device, a virtual machine, etc. In one example, server machine or security appliance 102N performs activities associated with cross-enterprise computer security system 130 in addition to one or more other security activities, such as network security, application security, file security, data security, etc.

Server machine or security appliance 102N also may be a dedicated security device that a respective organization uses to participate in a cross-enterprise security exchange with other participating organizations. In an example, a cross-enterprise security exchange may be provided by one or more trusted participants of an exchange or by one or more independent, trusted third-parties (e.g., a non-profit, governmental organization, or any other non-members that offer cross-enterprise security exchange services to a plurality of registered member organizations).

A cross-enterprise security exchange generally refers to one or more centralized computer systems of a trusted service where different participating organizations securely send various types of anonymized and/or non-anonymized data (e.g., authentication data, security data, computer system data, etc.) to be compared and matched to anonymized and/or non-anonymized data of other participating organizations. For example, each participating organization may contract, register, and directly interact with a trusted centralized cross-enterprise security exchange instead of contracting and/or directly interacting with other organizations participating in the exchange.

Server machine(s) 110, client device(s) 102A, and server machine(s)/security appliance(s) 102N each may include a respective cross-enterprise computer security module (e.g., cross-enterprise computer security system 130, 130A, 130N), secure communication module (e.g., secure communication module 140, 140A, 140N), and security manager module (e.g., 150, 150A, 150N). In various examples, such modules may be combined, divided, or otherwise organized in various arrangements on one or more computing devices.

Server machine 110 may include one or more web servers 120 and application servers 122. Web server 120 may provide text, audio, image, and video content from server machine 110 or other sources (e.g., data store 180) to client device 102A and server machine or security appliance 102N. Web server 120 also may provide web-based application services, business logic, updates, and one or more secure communication channels (e.g., secure application programming interfaces (APIs)) to client device 102A and server machine or security appliance 102N. Client device 102A and server machine or security appliance 102N may locate, access, and consume various forms of content and services from web server 120 using applications, such as a web browser, web servers, other types of computer applications, various secure application programming interfaces, etc. Web server 120 also may receive text, audio, video, and image content from client device 102A and server machine or security appliance 102N, which may be stored in data store 180 for preservation and/or sharing of content.

In an example, web server 120 is coupled to one or more application servers 122 that provide application services, data, business logic, and/or secure application programming interfaces (APIs) to client device 102A and server machine or security appliance 102N. In some examples, application servers 122 also may provide such services to client device 102A and client security appliance device 102N without use of web server 120.

In an example, web server 120 may provide client device 102A and server machine or security appliance 102N with access to one or more application server 122 services associated with cross-enterprise computer security system 130. Such functionality also may be provided as part of one or more different web applications, standalone applications, systems, plug-ins, web browser extensions, and secure (e.g., encrypted, password protected, and/or secret) application programming interfaces (APIs). In some examples, plug-ins and extensions generally may be referred to, individually or collectively, as "add-ons."

In an example, client device 102A and server machine or security appliance 102N may include an application associated with a service provided by server machine 110 (e.g., cross-enterprise computer security system 130). For example, various types of computing devices (e.g., smart phones, smart televisions, tablet computers, smart wearable devices, smart home computer systems, etc.) may use specialized applications to access services provided by server machine 110, to issue commands to server machine 110, and/or to receive content from server machine 110 without visiting or using web pages.

In an example, functions performed by server machine 110 may also be performed by client device 102A and server machine or client security appliance device 102N, in whole or in part. In addition, the functionality attributed to a particular component may be performed by different or multiple components operating together. Server machine 110 may be accessed as a service provided by systems or devices via appropriate secure application programming interfaces (APIs) and data feeds, and thus is not limited to use with websites. Further, server machine(s) 110 may be associated with and/or utilize one or more cross-enterprise security exchanges.

Figure 2:
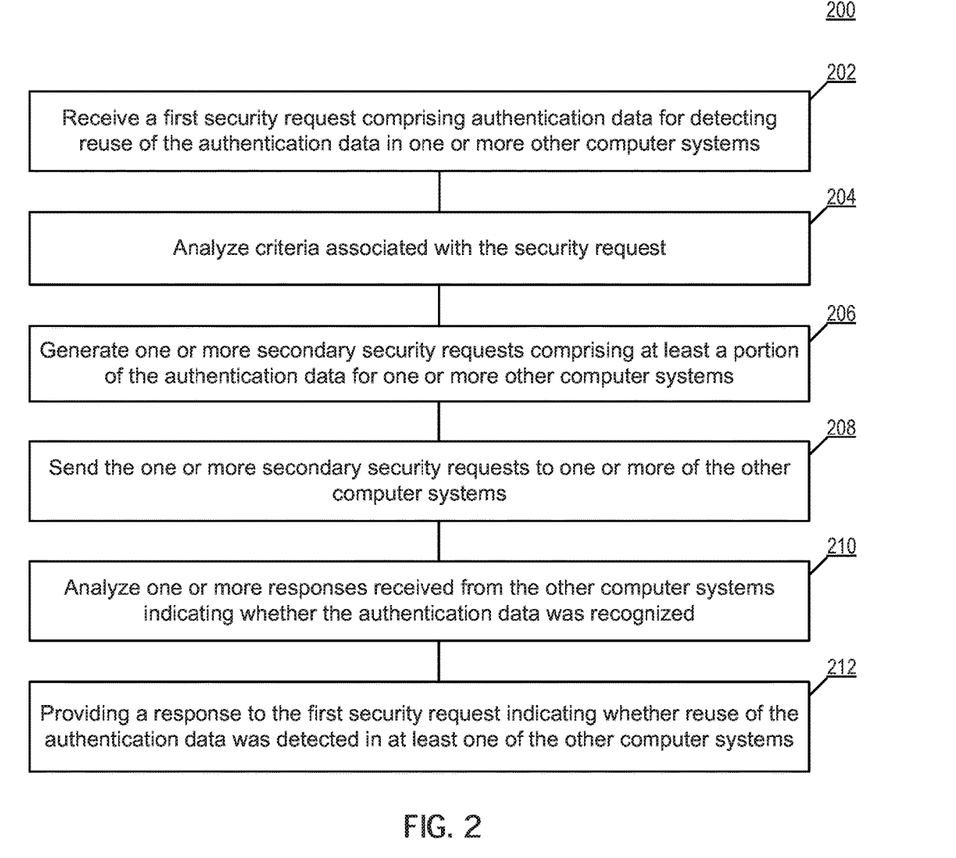
FIG. 2 is a flow diagram for detecting reuse of authentication data across different computer systems while maintaining privacy of the authentication data, according to an example of the present disclosure.

FIG. 2 is a flow diagram for detecting reuse of authentication data across different computer systems while maintaining privacy of the authentication data, according to an example of the present disclosure. The method 200 may be performed by processing logic that may comprise hardware (e.g., circuitry, dedicated logic, programmable logic, microcode, etc.), software (e.g., instructions run on a general purpose computer system, dedicated machine, or processing device), firmware, or a combination thereof. Examples of method 200 are described from the perspective of cross-enterprise computer security system 130 for the sake of consistency and apply to other cross-enterprise computer security system 130A-130N examples described herein.

Method 200 begins at block 202 when secure communication module 140 of cross-enterprise computer security system 130 receives a first security request comprising authentication data for detecting reuse of the authentication data in one or more other computer systems. In an example, a trusted third party provides a plurality of different participating organizations with secure access to cross-enterprise computer security system 130 of server machine 110, allowing each one of the different organizations to detect reuse of authentication data in computer systems of one or more of the other respective organizations while preserving privacy and not disclosing one or more actual values of the authentication data to any other participating organization.

For example, any one of the participating organizations then may submit one or more sets of anonymized authentication data to determine whether any of the authentication data has been used in one or more unassociated external computer systems operated by a different organization. For example, an online financial services provider may use cross-enterprise computer security system 130 to check whether one or more users have reused authentication credentials on a social networking or mail provider, or whether such authentication credentials are associated with a suspected or known data breach.

In an example, client device 102A or server machine/security appliance 102N of a source or originating organization generates a request for detecting reuse of authentication data in one or more other computer systems of different organizations in response to or based on an event. For example, an event may include creation of new authentication data, modification or changing of authentication data, use of authentication data to access computing resources, suspected misuse of authentication data in view of anomaly detection or some other security-related analysis (e.g., detection of a new user location). Thus, an event may be triggered based on actual use or involvement of the authentication data in one or more different processes.

In other examples, an event may be triggered based on other criteria that may not involve direct use of the authentication data. For example, client device 102A or server machine/security appliance 102N also may generate and send a request for detecting reuse of authentication data randomly, based on a scheduled time or unscheduled administrator or user request, based on a known or suspected security breach within the organization, based on a known or suspected security breach associated with one or more external organizations, based on new or existing authentication data recovered from a data breach (e.g., posted online, retrieved from the dark web, or otherwise becoming available for analysis), etc.

Authentication data generally refers to one or more security credentials of an entity, individual, group, or machine that are used to gain access to one or more different computer system resources. Authentication data may be a single piece of data, such as a personal identification number, an answer to a question, a one-time or multi-use password or token, a biometric signature, etc. Authentication data also may be a combination of multiple data elements. For example, authentication data may be a combination of any two or more of a numeric or alphanumeric identifier, a username, an email address, a password, a passcode, an answer to a challenge question, a piece of information known or available to a user, a government identification number, a financial account identifier, one or more fingerprints, one or more handprints, vascular data patterns, a voiceprint, retinal scan data, iris scan data, a cryptographic device marker, a token, location data, etc. Thus, a user or other entity may provide one or more pieces of authentication data to one or more different computer systems in an attempt to gain access to one or more different computing resources (e.g., a private network, a server machine, an online account, a smart wearable or non-wearable computing device, a driverless vehicle, etc.).

In an example, each of one or more different organizations may wish to check whether authentication data associated with a user or entity has been reused in association with another computer system of a different organization. However, while each respective organization retains control of its own computer systems within a single enterprise, such organizations generally do not have the ability to securely check for authentication data reuse in external computer systems outside of the organization while maintaining privacy of original authentication data by not disclosing one or more critically secure elements of the original authentication data to an external party.

In general, organizations have various reasons for detecting and eliminating authentication data reuse across unrelated systems. For example, an organization may wish to prevent a situation where cybercriminals steal or acquire stolen authentication data from another organization and then use the stolen data to illegally access and exploit user accounts. In one example, cybercriminals may steal authentication data directly from users or from another organization, such as a social media provider.

Cybercriminals, knowing that many users reuse authentication credentials across different online systems and Internet sites, then may attempt to use the stolen authentication credentials to access online financial accounts, online payment accounts, online electronic commerce accounts, and other accounts that can be monetized and exploited based reused authentication data. As such, organizations would greatly benefit from detecting and preventing authentication data reuse across different computer systems to protect user assets and user privacy while minimizing criminal activity and resulting losses.

In an example, a security manager module (e.g., security manager module 150A, 150N) of client device 102A or server machine/security appliance 102N generates a security request comprising authentication data for detecting reuse of the authentication data across one or more other computer systems external to and beyond control of an organization. In some examples, authentication data associated with the security request may be anonymized to maintain privacy of the authentication data and to prevent other organizations from discerning or determining an actual or true value of the original authentication data. In some examples, the authentication data may be partially anonymized so that one or more elements or pieces of the authentication data are anonymized while one or more other elements of the authentication data remain unaltered or in an original state.

In an example, each organization participating in a cross-enterprise computer security exchange may use a common anonymization scheme maintained by a centralized trusted third-party to anonymize and maintain privacy of authentication data. In some examples, one or more of each respective organization participating in a cross-enterprise computer exchange may use a different respective anonymization scheme understood between the respective organization and the trusted third-party operating the exchange. In such examples, the trusted third-party then may translate between various anonymization schemes associated with different respective organizations when communicating among various organizations and performing services to detect reuse of authentication data across different computer systems.

In an example, anonymization generally refers to translating or transforming an original version of authentication data into another version of the data that is unintelligible and indecipherable by an untrusted party. As such, anonymization protects data privacy so that the meaning of the original data remains secret and unknown to untrusted parties. In some examples, security manager module 150 of cross-enterprise security system 130 receives, stores, maintains, compares, searches, finds, retrieves, correlates, matches, and translates anonymized authentication data associated with one or more various anonymization schemes.

In an example, security manager module 150, 150A, 150N anonymizes one or more authentication data elements, rendering such elements as obfuscated, unintelligible, or indecipherable (e.g., hashed, double-hashed, triple-hashed, etc.). Such anonymization may be used to protect the privacy of one or more authentication data elements so that the original data remains private, secret, and unknown to other organizations or outside parties, which in some examples may include a cross-enterprise computer security exchange.

In an example, security manager module 150, 150A, 150N anonymizes authentication data by performing one or more transformational processes on the data. For example, security manager module 150, 150A, 150N may apply one or more cryptographic transformations (e.g., such as a one-way cryptographic hash function), by hashing one, multiple, or a combination of authentication data elements one or more times, by encrypting one or more of the authentication data elements one or more times, and/or otherwise by transforming the authentication data elements according to one or more other various processes, etc.

In an example, security manager module 150A, 150N of client device 102A or server machine/security appliance 102N generates a security request comprising authentication data and one or more criteria to instruct a centralized cross-enterprise security system 150 on how to query one or more other computer systems of different organizations for detecting reuse of authentication data. Such criteria may include one or more unique identifiers or names of one or more other participating organizations, one or more industry categories of participants to query, a parameter or command to detect current reuse of authentication data, a parameter or command to detect prior reuse of authentication data, a date range for detecting prior reuse of authentication data, a parameter or identifier indicating to query organizations associated with a particular data breach, a requested or required response time, etc.

In an example, secure communication module 140A, 140N of client device 102A or server machine/security appliance 102N then sends a generated security request for detecting authentication data reuse to secure communication module 140 of cross-enterprise computer security system 130. For example, various secure communication modules 140, 140A, 140N may communicate using one or more password protected, encrypted, and/or private application programming interfaces. In one example, each participating organization may be provided with the same secure application programming interface (API), a different secure API, a different communication channel associated with a secure API, different authentication credentials to access a protected API, etc. Further, various trusted client devices 102A and server machines/security appliances 102N may be authorized or pre-authorized with cross-enterprise computer security system 130 based on a pending or completed registration process.

At block 204, security manager module 150 of cross-enterprise computer security system 130 analyzes criteria associated with the security request. In an example, security manager module 150 analyzes an incoming authentication data reuse security request received by secure communication module 140.

In an example, security manager module 150 determines an identity of the organization sending the security request, determines whether one or more authentication data elements received with the security request have been anonymized, and identifies which of one or more authentication data elements have been provided when preparing to process the security request.

In an example, security manager module 150 analyzes information provided with a security request or stored organizational preferences to determine which of one or more computer systems from different organizations to contact for detecting authentication data reuse. For example, security manager module 150 may determine based on information associated with the security request or a stored organizational preference that one or more computer systems of one or more specific organizations, one or more specific industries (e.g., social media, technology, finance, entertainment, etc.), one or more geographies, one or more security statuses (e.g., safe, under threat, breached, etc.), and/or one or more other categories or classifications to identify computer systems to contact in response to a security request.

In some examples, security manager module 150 also may determine based on organizational preference or information associated with an incoming security request that an organization wishes to check authentication data collected from or associated with a data breach. For example, security manager module 150 may retrieve and store stolen authentication data reported from participating organizations, reported from non-participating organizations, recovered from the internet, or otherwise received. Security manager module 150 then may search stored authentication data associated at least one data breach to determine whether authentication data received in a security request matches authentication data associated with a security breach.

In an example, security manager module 150 determines whether incoming authentication data associated with a security request is to be anonymized or translated based on one or more different anonymization schemes associated with one or more other respective organizations. In one example, one or more authentication data elements may arrive as non-anonymized data and may need to be anonymized according to a common or organization-specific anonymization scheme before communicating such data to another organization in association with detecting reuse of authentication data outside of an organization.

At block 206, security manager module 150 of cross-enterprise computer security system 130 generates one or more secondary security requests comprising at least a portion of the authentication data for one or more other computer systems.

In an example, security manager module 150 determines based on information associated with the security request and/or one or more stored organizational preferences that at least one computer system of one or more organizations (e.g., corporate entity, domain, internet address, etc.), organizations of one or more industries (e.g., social media, technology, finance, healthcare, entertainment, gaming, government, university, etc.), organizations or computer systems of one or more geographies, organizations or computer systems of one or more security statuses (e.g., safe, under threat, breached, strong security, weak security, etc.), and/or one or more other categories or classifications are to be contacted in response to an incoming security request.

In an example, security manager module 150 generates a common secondary request to send to one or more computer systems of at least one different organization. For example, security manager module 150 may generate commonly formatted or standardized secondary security requests comprising anonymized authentication data based on a standard anonymization scheme associated with a cross-enterprise computer security exchange.

In an example, security manager module 150 generates a custom secondary security request to send to each of one or more computer systems of at least one different organization. For example, security manager module 150 may generate one or more secondary security requests based on a format associated with a particular organization or computer system. In addition, each of two or more of the secondary security requests may be based on different anonymization schemes associated with different respective participating organizations.

For example, security manager module 150 may generate a secondary security request for a computer system associated with a first recipient organization comprising anonymized authentication data based on an anonymization scheme associated with the first recipient organization. In addition, security manager module 150 may generate another secondary security request for a computer system associated with a second recipient organization comprising anonymized authentication data based on a different anonymization scheme associated with the second recipient organization.

In an example, a secondary security request generated by security manager module 150, may comprise information indicating which of two or more anonymized authentication data elements (if multiple) are to be matched with anonymized authentication data of a receiving organization and whether complete or partial matches across authentication data elements are to be reported. Secondary security requests also may indicate whether current or past authentication data is to be evaluated and one or more time periods to search for past authentication data. Further, secondary security requests also may indicate request and/or required response times.

At block 208, secure communication module 140 of cross-enterprise computer security system 130 sends the one or more secondary security requests to each of the one or more other computer systems. In an example, secure communication module 140 sends respective secondary security requests to secure communication modules 140A, 140N of various client devices 102A and/or server machines/security appliances 102N of various organizations based on the analyzing performed at block 204 and the generating performed at block 208.

In an example, client device 102A or server machine/security appliance 102N receives a secondary security request from secure communication module 140 and processes the request. In one example, communication module 140A, 140N, determines criteria associated with the secondary request and which of one or more anonymized authentication data elements from the request are to be searched, compared, and/or matched to authentication data associated with a respective computer system or organization.

In an example, security manager module 150A, 150N of a computer system receives a secondary security request and matches one or more anonymized or non-anonymized authentication data elements, such as a unique or non-unique user identifier (e.g., email address, username, user identifier, etc.), password data, biometric data, etc. Security manager module 150A, 150N then may return a result indicating whether the authentication data element was in whole or in part detected in authentication data or an anonymized version of authentication data available to security manager module 150A, 150N.

In some examples, security manager module 150A, 150N is provided partial authentication data, such as a single anonymized or original authentication data element (e.g., a unique or non-unique user identifier such as an email address, a username, a user identifier, etc.). In response, security manager module 150A, 150N may return one or more different anonymized authentication data elements for each matching authentication data record. For example, security manager module 150A, 150N may return an anonymized version of a password to security manager module 150 based on detecting a matching email address of an account. Security manager module 150 then may compare the anonymized version of the password returned for the matching email address to an anonymized password received in an initial security request (after translating between anonymization schemes, if needed), and determine whether the email address and password combination authentication data credentials were reused in different systems.

In an example, each of a plurality of security manager modules 150A, 150N processes a respective secondary security request and provides a corresponding response to security manager module 150 via a secure application programming interface provided by secure communication module 140 of cross-enterprise computer security system 130.

At block 210, security manager module 150 of cross-enterprise computer security system 130 analyzes one or more responses received from the other computer systems indicating whether the authentication data was detected. In an example, security manager module 150 receives a response from each of a plurality of computer systems provided with a secondary security request indicating whether anonymized authentication data associated with the secondary security request was found in association with each respective computer system.

For example, five of six client devices 102A or server machines/security appliances 102N may indicate there was no match detected for anonymized authentication data (e.g., an anonymized username password combination). However, one of the six may indicate that the anonymized authentication data matches current or past authentication data based on comparison to an anonymized version of the authentication data associated with the other system. Security manager module 150 collects and analyzes such responses and may perform its own comparing based on anonymized authentication data returned from any of the other systems to prepare a determinative response indicating whether authentication data reuse was detected.

At block 212, secure communication module 140 of cross-enterprise computer security system 130 provides a response to the first security request indicating whether reuse of the authentication data was detected in at least one of the other computer systems. In an example, secure communication module 140 provides a response to a requesting computer system indicating whether authentication data associated with a security request was detected by at least one other computer system of a different organization.

In an example, secure communication module 140 provides a general or anonymized response simply indicating whether authentication data reuse was or was not detected. Secure communication module 140 also may provide varying degrees of description with a response. For example, secure communication module 140 may indicate authentication data reuse was detected in a number of total systems or organizations searched (e.g., 1 of 10). Secure communication module 140 also may indicate additional generalized information associated with detected authentication data reuse, such as one or more industries, one or more geographies, one or more data breaches, an indication of past reuse and/or an indication of current reuse, or any other attributes associated with detected authentication data reuse.

In an example, secure communication module 140A, 140N receives a response to a security request, and security manager module 150A, 150 takes one or more actions in response to receiving an indication that reuse of authentication data was detected in at least one other computer system. For example, security manager module 150A, 150 may warn a user within a session (e.g., during account creation, when presenting authentication data as part of a login process, when changing or updating authentication data, etc.) that existing and/or new authentication data associated with an account is associated with current authentication data on another computer system, past authentication data on another computer system, or authentication data compromised during a data breach.

In an example, security manager module 150A, 150 also may warn a user or entity outside of an active session that an account is at risk because authentication data associated with the account is being reused or previously has been reused on one or more different computer systems. For example, security manager module 150A, 150 may send an email, text, message, or other communication to a user at a time other when the user is offline or not involved with presenting or manipulating authentication data.

In some examples, security manager module 150A, 150 may go beyond warning or educating a user about detected reuse of authentication data on another computer system. For example, security manager module 150A, 150 may require or force a user to modify or change one or more authentication data elements, such as a unique identifier, password, secret data, personal identifier or some other authentication data element(s) to create a set or combination of one or more authentication data elements that have not been reused on a different computer system. As such, security manager module 150A, 150 may prevent a user from creating an account, accessing an account, or performing further activity until authentication data has been updated appropriately. Security manager module 150A, 150 also may disable or lock an account and force a user to use one or more alternative methods of authentication until reused authentication data can be replaced.

Figure 3:
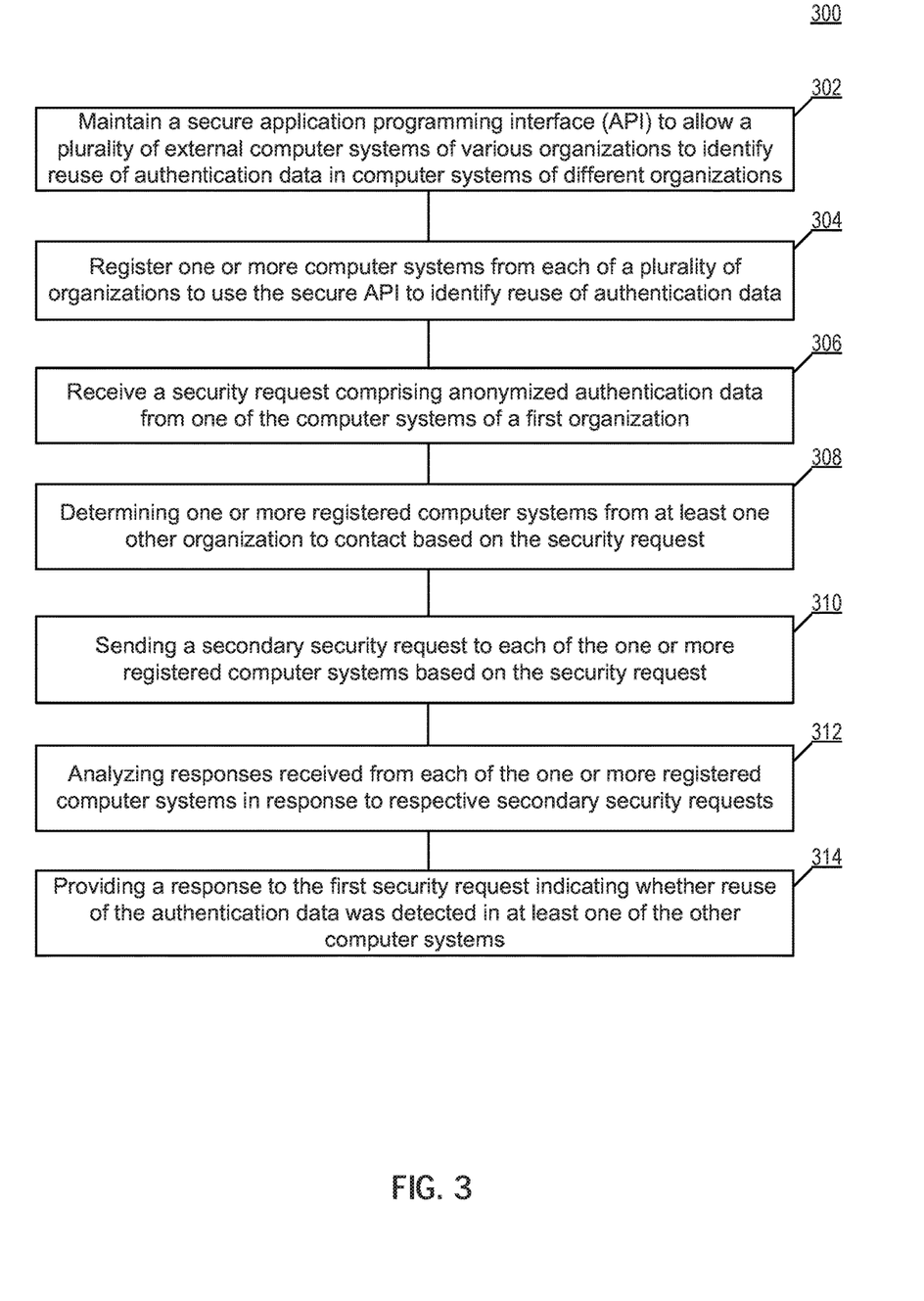
FIG. 3 is a flow diagram for providing a security service to allow each of a plurality of different participating organizations to detect authentication data reuse in computer systems of one or more of the other participating organizations, according to an example of the present disclosure.

FIG. 3 is a flow diagram for providing a security service to allow each of a plurality of different participating organizations to detect authentication data reuse in computer systems of one or more of the other participating organizations, according to an example of the present disclosure. The method 300 may be performed by processing logic that may comprise hardware (e.g., circuitry, dedicated logic, programmable logic, microcode, etc.), software (e.g., instructions run on a general purpose computer system, dedicated machine, or processing device), firmware, or a combination thereof. Examples of method 300 generally are described from the perspective of cross-enterprise computer security system 130 for the sake of consistency and also apply to other cross-enterprise computer security system 130A-130N examples described herein.

At block 302, secure communication module 140 of cross-enterprise computer security system 130 maintains a secure application programming interface (API) to allow each of a plurality of external computer systems of various organizations to identify reuse of authentication data in computer systems of different organizations. In an example, secure communication module 140 maintains one or more secure application programming interfaces (APIs) for each of one or more different organizations participating in a cross-enterprise computer security exchange.

In various examples, secure communication module 140 uses secure APIs to privately communicate with one or more different client devices 102A or server machines/security appliances 102N of different organizations. Secure APIs may include, for example, undisclosed, encrypted, password protected, and/or virtual private communication channels or APIs. In addition, secure communication module 140 may receive a security request via a first secure API and then communicate with each of a plurality of other organizations using one or more different secure APIs associated with each other respective organization.

At block 304, security manager module 150 of cross-enterprise computer security system 130 registers one or more computer systems from each of a plurality of organizations to use the secure API to identify reuse of authentication data. In an example, security manager module 150 registers one or more client devices 102A and/or server machines/security appliances 102N associated with an organization. For example, registration may be based on participation of an organization in a cross-enterprise computer security exchange where different organizations share anonymized security information to improve security practices and to prevent data breaches.

In various examples, organization participating in a cross-enterprise security exchange registers one or more client devices 102A and/or server machines/security appliances to enable the various computer systems to communicate with cross-enterprise computer security system 130 via a secure application programming interface (API). In some examples, security manager module 150 of server machine 110 may generate public/private keys and distribute one or more public keys to respective organizations as part of registration. Security manager module 150 also may generate a unique authentication scheme for each of one or more different organizations participating in a cross-enterprise security exchange to allow each participating organization to uniquely anonymize sensitive data in communications with cross-enterprise security system. Further, security manager module 150 also may distribute one or more organization-specific security modules to each respective participating organization during a registration process to provide respective organizations with software and/or hardware to facilitate data security, data anonymization, and detection of authentication data reuse locally on client devices 102A and/or server machines/security appliances 102N.

At block 306, secure communication module 140 of cross-enterprise computer security system 130 receives a security request comprising anonymized authentication data from one of the computer systems of a first organization. In an example, secure communication module 140 receives the first security request from client device 102A or server machine/security appliance 102N via a secure application programming interface.

In an example, the first security request includes anonymized authentication data (e.g., anonymized authentication credentials) and one or more criteria or instructions for detecting reuse of the authentication data in one or more other computer systems from different organizations. In various examples, authentication data reuse detection criteria or instructions may include, but are not limited to, specific or wildcard identifiers of one or more different software applications, internet websites, computer systems, networks, network addresses, organizations, corporate entities, domains, internet addresses, etc., one or more industries or categories associated with a computer system and/or an organization (e.g., social media, technology, finance, healthcare, entertainment, gaming, government, university, etc.), one or more geographies associated with a computer system and/or an organization, one or more security statuses associated with a computer system and/or an organization (e.g., safe, under threat, breached, strong security, weak security, etc.), and/or any one or more other categories or classifications to determine which computer systems to contact in response to an incoming security request.

At block 308, security manager module 150 of cross-enterprise computer security system 130 determines one or more registered computer systems from at least one other organization to contact based on the security request. In an example, security manager module 150 analyzes one or more criteria or organizational preferences associated with an incoming security request to determine which other computer systems of different organizations to query for detecting reuse of authentication data.

In various examples, security manager module 150 may determine based on a security request one or more computer systems or organizations associated with an industry, geography, security status, and/or other categories or classifications that are to be contacted in association with the security request. In some examples, security manager module 150 may also determine that authentication data associated with a security request is to be checked against authentication data recovered from a known or suspected security breach.

In an example, security manager module 150 then determines whether a computer system that is to be contacted in response to a security request uses the same data anonymization scheme or a different data anonymization scheme as compared an anonymization scheme of anonymized authentication data. In some examples, two or more organizations may use the same anonymization scheme to anonymize authentication data. For example, every member of a cross-enterprise computer security exchange or a consortium of members within the exchange may use the same anonymization scheme and can analyze and/or process anonymized data from other similar organizations. In other examples, each different organization participating in the exchange uses a different anonymization scheme to maintain privacy of the underlying authentication data.

In an example, security manager module 150 generates, manages, and maintains various data authentication schemes used among organizations participating in a cross-enterprise computer security exchange. In some examples, security manager module 150 determines that anonymized data is to be translated or transformed from one anonymization scheme to another anonymization scheme to allow a different organization to process associated anonymized data.

In an example, security manager module 150 may de-anonymize authentication data associated with one anonymization scheme, yielding an original or true version of the authentication data value(s). Security manager module 150 then may re-anonymize the original or true version of the authentication data based on a different anonymization scheme associated with another computer system and/or organization. In another example, security manager module 150 may perform a direct translation or transformation from one authentication scheme to another authentication scheme without ever knowing an original or true version of the authentication data value(s). For example, security manager module 150 may perform such a direct translation or transformation to allow another organization using a different authentication scheme to detect reuse of associated authentication based on a different anonymization scheme to maintain data privacy across organizations.

At block 310, secure communication module 140 of cross-enterprise computer security system 130 sends a secondary security request to each of the one or more registered computer systems based on the security request. In an example, secure communication module 140 sends secondary requests generated by security manager module 150 to each of one or more computer systems identified at block 308.

In an example, security manager module 150 generates a standard secondary request that it sends to each one of a plurality of different computer systems. In one example, the standard secondary security request comprises authentication data anonymized based on a standardized anonymization scheme used by a plurality of participating organizations. In another example, the standard secondary security request sent to different computer system may include or be accompanied by authentication data anonymized based on one of multiple different data anonymization schemes (e.g., an anonymization scheme used by a respective organization).

In an example, security manager module 150 generates a secondary security request for each of a plurality of different organizations. For example, security manager module 150 may generate one or more secondary security requests for computer systems of an organization based on a format associated with or used by the organization. In addition, security manager module 150 may generate one or more other different secondary security requests for computer systems of another organization. Further, authentication data included or associated with a security request may be anonymized based on a common data anonymization scheme or may be anonymized based on a data anonymization scheme associated with an organization that is to receive the corresponding secondary security request.

At block 312, security manager module 150 of cross-enterprise computer security system 130 analyzes responses received from each of the one or more registered computer systems in response to respective secondary security requests. In an example, security manager module 150 receives a response from one or more of a plurality of computer systems provided with a secondary security request. For example security manager module 150 may analyze various data and attributes associated with secondary security request responses to determine whether authentication data associated with the security request was detected (e.g., identified, discovered, matched, etc.) to authentication data associated with and/or available to the computer system that received and processed the secondary security request. In an example, security manager module 150 generates a single, determinative response to an initial security request indicating whether authentication data reuse was detected in another system of a different organization.

At block 314, secure communication module 140 of cross-enterprise computer security system 130 provides a response to the security request indicating whether the authentication data associated with the security request was detected in at least one other computer system based on the responses from the other computer systems. In an example, security manager module 150 generates a response indicating whether anonymized authentication data associated with a security request was detected in another computer system based on analyzing one or more secondary security request responses. Secure communication module 140 then provides the generated response to the computer system that sent the initial security request.

In an example, client device 102A or server machine/security appliance 102N may take one or more actions in response to receiving a response indication that a user reused authentication data associated with an account in a different computer system associated with another organization. For example, a respective security manager module 150A, 150 may simply notify or warn the user that reusing authentication credentials on different systems is a serious security risk and that the user assumes liability of such actions. Then the user may be provided with an opportunity to change one or more authentication data elements to create a unique set of authentication data that is not present on another system. In various examples, a user may be required to modify authentication data or may be allowed to bypass such warnings and opportunities to change authentication data, as determined by an organization.

In an example, security manager module 150 may analyze one or more set of anonymized authentication data provided by each one of a plurality of different organizations participating in a cross-enterprise computer security exchange. For example, various organizations may send partial, full, or random sets of anonymized authentication data to cross-enterprise computer security system 130 for periodic analysis and matching. In one example, security manager module 150 may send an alert to each of two or more computer systems of different organizations based on detecting that one or more sets of authentication data have been reused on each of the systems. In addition, the alert generally may comprise the reused authentication data to allow each organization to take appropriate action to educate the user and correct the security risk.

In one example, security manager module 150 also may analyze one or more sets of incoming anonymized authentication data provided by each one of a plurality of different organizations against existing or newly acquired sets of authentication data associated with or suspected to be associated with a security breach. Similarly, respective organizations generally may be alerted when authentication data associated with an account matches authentication data recovered from a security breach to allow the organizations to take appropriate precautionary and remedial actions.

Figure 4:
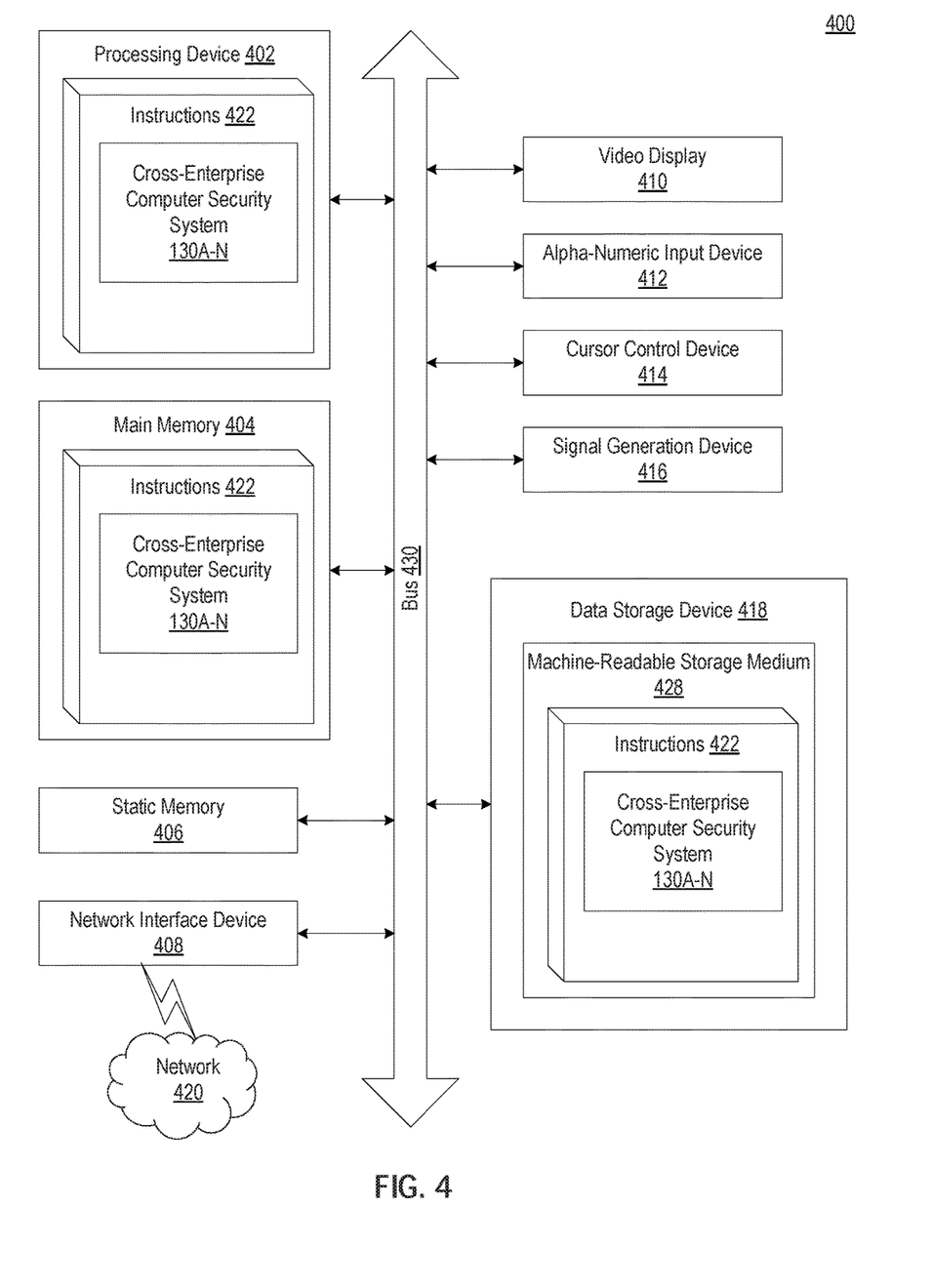
FIG. 4 is a block diagram of an exemplary computer system that may perform one or more of the operations described herein.

FIG. 4 illustrates a diagram of a machine in the exemplary form of a computer system 400, within which a set of instructions for causing the machine to perform any one or more of the methodologies discussed herein may be executed. In other examples, the machine may be connected (e.g., networked) to other machines in a LAN, an intranet, an extranet, or the Internet. The machine may operate in the capacity of a server or a client device in client-server network environment, or as a peer machine in a peer-to-peer (or distributed) network environment. The machine may be a personal computer (PC), a tablet PC, a set-top box (STB), a Personal Digital Assistant (PDA), a cellular telephone, a wearable computing device, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device (processor) 402, a main memory 404 (e.g., read-only memory (ROM), flash memory, dynamic random access memory (DRAM) such as synchronous DRAM (SDRAM), double data rate (DDR SDRAM), or DRAM (RDRAM), etc.), a static memory 406 (e.g., flash memory, static random access memory (SRAM), etc.), and a data storage device 418, which communicate with each other via a bus 430.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 also may be one or more special-purpose processing devices such as an application specific integrated circuit (ASIC), a field programmable gate array (FPGA), a digital signal processor (DSP), network processor, or the like. The processor 402 is configured to execute instructions 422 for performing the operations and steps discussed herein.

The computer system 400 also may include a network interface device 408. The computer system 400 may further include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a computer-readable storage medium 428 on which is stored one or more sets of instructions 422 (e.g., software computer instructions) embodying any one or more of the methodologies or functions described herein. The instructions 422 also may reside, completely or at least partially, within the main memory 404 and/or within the processor 402 during execution thereof by the computer system 400, the main memory 404 and the processor 402 also constituting computer-readable storage media. The instructions 422 may be transmitted or received over a network 420 via the network interface device 408.

In one example, the instructions 422 include instructions for one or more modules of a cross-organization account security system (e.g., cross-enterprise account security system 130 of FIG. 1) and/or a software library containing methods that call a cross-enterprise account security system 130. While the computer-readable storage medium 428 (machine-readable storage medium) is shown as an example to be a single medium, the term "computer-readable storage medium" should be taken to include a single medium or multiple media (e.g., a centralized or distributed database, and/or associated caches and servers) that store the one or more sets of instructions. The term "computer-readable storage medium" also may include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Numerous details are set forth in the foregoing description. However, it will be apparent to one of ordinary skill in the art having the benefit of this disclosure that the present disclosure may be practiced without these specific details. In some instances, well-known structures and devices are shown in block diagram form, rather than in detail, to avoid obscuring the present disclosure.

Some portions of the detailed description have been presented in terms of algorithms and symbolic representations of operations on data bits within a computer memory. Here, an algorithm is generally conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "computing," "comparing," "associating," "applying," "transmitting," "receiving," "processing" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain examples of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other examples will be apparent to those of skill in the art upon reading and understanding the above description. The scope of the disclosure therefore should be determined with reference to the appended claims, along with the full scope of equivalents to which such claims are entitled.

What is claimed is:

1. A computer system for detecting reuse of authentication data in different organizations, comprising:
a non-transitory memory; and
one or more hardware processors coupled to the non-transitory memory and configured to read instructions from the non-transitory memory to cause the computer system to perform operations comprising:
receiving, from a first server machine associated with a first organization, a first security request comprising first authentication data usable for authenticating a user with the first organization, wherein the first security request is addressed to the computer system for detecting reuse of the first authentication data by the user with at least one other organization;
identifying, among a plurality of organizations, a second organization to detect reuse of the first authentication data based on one or more criteria associated with the first security request;
generating a second security request comprising at least a portion of the first authentication data;
sending the second security request to a second server machine associated with the identified second organization;
receiving, from the second server machine, a response comprising second authentication data usable to authenticate the user with the second organization;
analyzing the response to determine whether the first authentication data matches the second authentication data; and in response to determining that the first authentication data matches the second authentication data, providing, to the first server machine, an alert indicating that the first authentication data was reused by the user with a different organization.

2. The computer system of claim 1, wherein the operations further comprise:
registering the first server machine of the first organization and the second server machine of the second organization to communicate with the computer system.

3. The computer system of claim 1, wherein the operations further comprise:
providing a secure application programming interface (API) to communicate with the first server machine and the second server machine.

4. The computer system of claim 1, wherein the operations further comprise:
identifying a third organization from the plurality of organizations to detect reuse of the first authentication data based on the one or more criteria;
sending the second security request to a third server machine associated with the third organization based on the identifying; and
receiving, from the third server machine, a second response comprising third authentication data usable for authenticating the user with the third organization,
wherein the alert provided to the first server machine is further based on analyzing the second response received from the third server machine.

5. The computer system of claim 1, wherein the second security request is generated based on an anonymization scheme associated with the second organization, and wherein the operations further comprise:
identifying a third organization from the plurality of organizations to detect reuse of the first authentication data based on the one or more criteria;
generating a third security request comprising at least a portion of the first authentication data based on an anonymization scheme associated with the third organization;
sending the third security request to a third server machine associated with the third organization; and
receiving, from the first server machine, a second response indicating whether the first authentication data was reused by the user with the third organization,
wherein the alert provided to the first server machine is further based on analyzing the second response received from the third server machine.

6. The computer system of claim 1, wherein the operations further comprise determining an anonymization scheme associated with the second server machine, wherein generating the second security request comprises anonymizing at least the portion of the first authentication data based on the anonymization scheme associated with the second server machine.

7. The computer system of claim 1, wherein the first authentication data in first security request is anonymized based on a first anonymization scheme associated with the first server machine, and wherein the operations further comprise:
de-anonymizing the first authentication data in the first security request based on the first anonymization scheme associated with the first server machine, wherein generating the second security request comprises re-anonymizing at least the portion of the de-anonymized first authentication data based on a second anonymization scheme associated with the second server machine.

8. The computer system of claim 1, wherein the operations further comprise:
determining that the first authentication data from the first security request matches third authentication data associated with a data breach, wherein the alert provided to the first server machine further indicates that the first authentication data may be compromised based on the data breach.

9. The computer system of claim 1, wherein the first authentication data is part of a user credential usable for the user to access a user account associated with a web-based application of the first organization.

10. The computer system of claim 1, wherein the first authentication data comprises a plurality of authentication data elements usable to obtain access to a user account associated with a web-based application of the first organization.

11. A non-transitory machine-readable medium having stored thereon machine-readable instructions executable to cause a machine to perform operations comprising:
receiving, from a first server machine associated with a first organization, a first security request comprising first authentication data usable to authenticate a user with the first organization, wherein the first security request is addressed to the machine for detecting reuse of the first authentication data by the user with another organization;
identifying a plurality of organizations to detect reuse of the first authentication data based at least in part on analyzing the first security request;
generating a second security request comprising at least a portion of the first authentication data;
sending the second security request to each one of a plurality of server machines associated with the plurality of organizations;
receiving a plurality of responses from the plurality of server machines;
analyzing the plurality of responses to determine whether the first authentication data is reused by the user with at least one of the plurality of organizations; and
in response to determining that the first authentication data is reused by the user with at least one of the plurality of organizations, providing an alert indicating that the first authentication data was reused by the user with a different organization.

12. The non-transitory machine-readable medium of claim 11, wherein the operations further comprise:
determining that the first authentication data is compromised in a security breach based on analyzing the plurality of responses.

13. The non-transitory machine-readable medium of claim 11, wherein the first security request is received in response to an event involving the authentication data.

14. The non-transitory machine-readable medium of claim 11, wherein the alert provided to the first server machine does not indicate identities of the plurality of organizations.

15. A computer-implemented method for detecting reuse of authentication data in different organizations, comprising:
receiving, by one or more hardware processors of a computer system from a first server machine associated with a first organization, a first security request comprising a first anonymized version of first authentication data usable for authenticating a user with the first organization, wherein the first security request is addressed to the computer system for detecting reuse of the first authentication data by the user with at least one other organization;

identifying, by the one or more hardware processors among a plurality of organizations, a second organization to detect reuse of the first authentication data based on one or more criteria associated with the first security request;

generating, by the one or more hardware processors, a second security request comprising a second anonymized version of the first authentication data;

sending, by the one or more hardware processors, the second security request to a second server machine associated with the identified second organization;

receiving, by the one or more hardware processors, a response comprising second authentication data usable to authenticate the user with the second organization;

analyzing, by the one or more hardware processors, the response to determine whether the first authentication data matches the second authentication data; and in response to determining that the first authentication data matches the second authentication data, providing, by the one or more hardware processors to the first server machine, an alert indicating that the first authentication data was reused by the user with a different organization.

16. The computer-implemented method of claim 15, wherein the first anonymization version of the first authentication data corresponds to a first anonymization scheme, wherein the second anonymized version of the first authentication data is generated based on a second anonymization scheme.

17. The computer-implemented method of claim 16, wherein the first anonymization scheme is associated with the first organization, and wherein the method further comprises determining the second anonymization scheme based on an identity of the second organization.

18. The computer-implemented method of claim 15, wherein the second anonymized version of the first authentication data is generated based on a one-way anonymization scheme.

19. The computer-implemented method of claim 15, wherein the second authentication data received from the second server machine is anonymized based on a third anonymization scheme, and wherein analyzing the response comprises:

anonymizing the first authentication data using the third anonymization scheme to generate a third anonymized version of the first authentication data; and comparing the third anonymized version of the first authentication data against the second authentication data.

20. The computer-implemented method of claim 15, further comprising:

determining that the first authentication data from the first security request matches third authentication data associated with a data breach, wherein the alert provided to the first server machine further indicates that the first authentication data may be compromised based on the data breach.

* * * * *